UNITED STATES PATENT OFFICE.

THOMAS CRISP SANDERSON, OF LONDON, ENGLAND.

MANUFACTURE OF WHITE LEAD.

SPECIFICATION forming part of Letters Patent No. 613,318, dated November 1, 1898.

Application filed September 9, 1897. Serial No. 651,124. (No specimens.)

*To all whom it may concern:*

Be it known that I, THOMAS CRISP SANDERSON, metallurgist, of Brooklyn, Humber road, Westcombe Park, London, England, have invented a new and useful Improvement in the Manufacture of White Lead, of which the following is a specification.

My invention consists of an improved process for the manufacture of white lead of high density.

White lead, as is well known, has hitherto been made principally by reacting upon metallic lead by means of moist air containing vapor of acetic acid and carbonic acid in the manner known in England as the "Dutch" or "stack" process. A product of like chemical composition can be more economically and quickly produced by precipitation of a suitable lead salt; but such precipitated products have hitherto been of too light density. It is found that when the chemical composition of the respective products is the same, and even when they appear of the same specific gravity when weighed in water, the weight in air of equal bulks of the products will show considerable difference, the precipitated article being much lighter. By my improved precipitating process I produce a new kind of precipitated white lead equal in its physical qualities to that produced by the slower and more expensive oxidation process.

In carrying my invention into effect I treat in a suitable vessel a charge of basic acetate-of-lead solution by blowing carbonic acid from a suitable source through the same until a precipitate of carbonate and hydrate of lead is thrown down. After the precipitate has been allowed to settle I draw off the clear normal acetate solution. I then run a fresh charge of basic acetate solution into the vessel, intermix therewith the precipitate already contained by stirring the same thoroughly, and treat the whole mixture again with carbonic acid, as before. This operation may be repeated as frequently as is found to be requisite. Finally the precipitate is run or pumped into filter presses or settlers to separate it from the liquid, after which it is washed and dried in the usual manner. The precipitate is agitated during the operation by means of a stirrer or agitator working near the bottom of the vessel. It will be found that the precipitate thus prepared is of much greater density than the same precipitate produced by a single operation.

In preparing a white lead containing definite proportions of plumbic hydrate and carbonate, respectively, I attain the object in view by varying the number of successive precipitations or the amount of precipitate carried over at each succeeding precipitation. When sufficient carbonic acid has been blown through the solution in order to reduce the basic acetate to the normal acetate of lead, the supply of carbonic acid is stopped and the precipitate allowed to subside; but it is better to prevent it from settling fast on the bottom by sufficiently agitating by means of the stirrer.

In place of conducting the whole operation in a single tank I find it advantageous, on the manufacturing scale, to draw off the whole or part of the precipitated white lead into a second vessel or tank, also provided with a stirrer, and there to precipitate another charge of basic acetate upon it in the same manner, repeating the operation as often as requisite to produce the required density and composition. The resultant normal acetate after being drawn off the precipitate is again used to produce basic acetate by resaturating with lead oxid in the well-known manner, any loss of acid being replaced by the addition of acetic acid and the first washings from the white lead.

Although I have described my process as applied to the precipitation of white lead from acetic-acid solution, it is also applicable to other soluble salts of lead capable of being precipitated by carbonic acid for this purpose.

What I claim is—

1. In the preparation of white lead by precipitation from basic lead solutions by carbonic acid, the steps of thoroughly commingling the precipitate from a prior basic lead solution with a subsequent basic lead solution and thereupon adding carbonic acid thereto, substantially as described.

2. The process of making white lead which consists in adding carbonic acid to a basic lead solution, separating the supernatant liquid therefrom then adding to the precipitate a fresh supply of basic lead solution then thoroughly agitating the precipitate and basic solution and finally adding carbonic acid thereto substantially as described.

In testimony whereof I have signed my name to this specification in the presence of two subscribing witnesses.

THOMAS CRISP SANDERSON.

Witnesses:
HERBERT SEFTON JONES,
FREDERICK WILLIAM LE TALL.